(12) United States Patent
Watanabe et al.

(10) Patent No.: US 11,869,547 B2
(45) Date of Patent: Jan. 9, 2024

(54) MAGNETIC DISK DEVICE, RW PARAMETER ADJUSTMENT METHOD OF THE MAGNETIC DISK DEVICE AND RW PARAMETER ADJUSTMENT DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Daisuke Watanabe, Yokohama Kanagawa (JP); Takuya Maeda, Kawasaki Kanagawa (JP); Masaya Ohtake, Fujisawa Kanagawa (JP); Takeshi Sudo, Yokohama Kanagawa (JP); Ryuichi Sato, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/903,911

(22) Filed: Sep. 6, 2022

(65) Prior Publication Data

US 2023/0298620 A1 Sep. 21, 2023

(30) Foreign Application Priority Data

Mar. 17, 2022 (JP) ................................ 2022-042712

(51) Int. Cl.
*G11B 5/09* (2006.01)
*G11B 27/36* (2006.01)
*G11B 5/012* (2006.01)

(52) U.S. Cl.
CPC .................................. *G11B 5/012* (2013.01)

(58) Field of Classification Search
CPC .............. G11B 55/3163; G11B 5/3166; G11B 5/59627; G11B 5/5582; G11B 5/3163;
(Continued)

(56) References Cited

U.S. PATENT DOCUMENTS 6,907,369 B1 * 6/2005 Markle ............ G05B 19/41875
702/182
10,699,193 B2 6/2020 Guo et al.
(Continued)

FOREIGN PATENT DOCUMENTS

JP 2021-081793 A 5/2021

*Primary Examiner* — Nabil Z Hindi
(74) *Attorney, Agent, or Firm* — Kim & Stewart LLP

(57) ABSTRACT

According to one embodiment, a read and write (RW) parameter adjustment method includes changing conditions of RW parameters to determine a capacity and characteristics for each of various heads of a test device to measure the characteristics and creating, for each of the heads, a database in which the measured characteristics are registered, and changing the conditions of the RW parameters for each of heads of a device to be adjusted to measure characteristics, searching the database created for each of the heads for a database having similar characteristics, and setting the capacity and characteristics in an appropriate balance based on the similar characteristics of the database obtained by the searching.

12 Claims, 6 Drawing Sheets

(58) Field of Classification Search
 CPC .................. G11B 27/36; G11B 5/3116; G11B 2220/2516; G11B 5/09; G11B 5/00; G06F 11/3684; G06F 11/3664
 USPC .................................................... 360/31, 25
 See application file for complete search history.

(56) References Cited

U.S. PATENT DOCUMENTS

| | | |
|---|---|---|
| 2021/0294281 A1 | 9/2021 | Nakagawa |
| 2022/0269996 A1 | 8/2022 | Nogami |

* cited by examiner

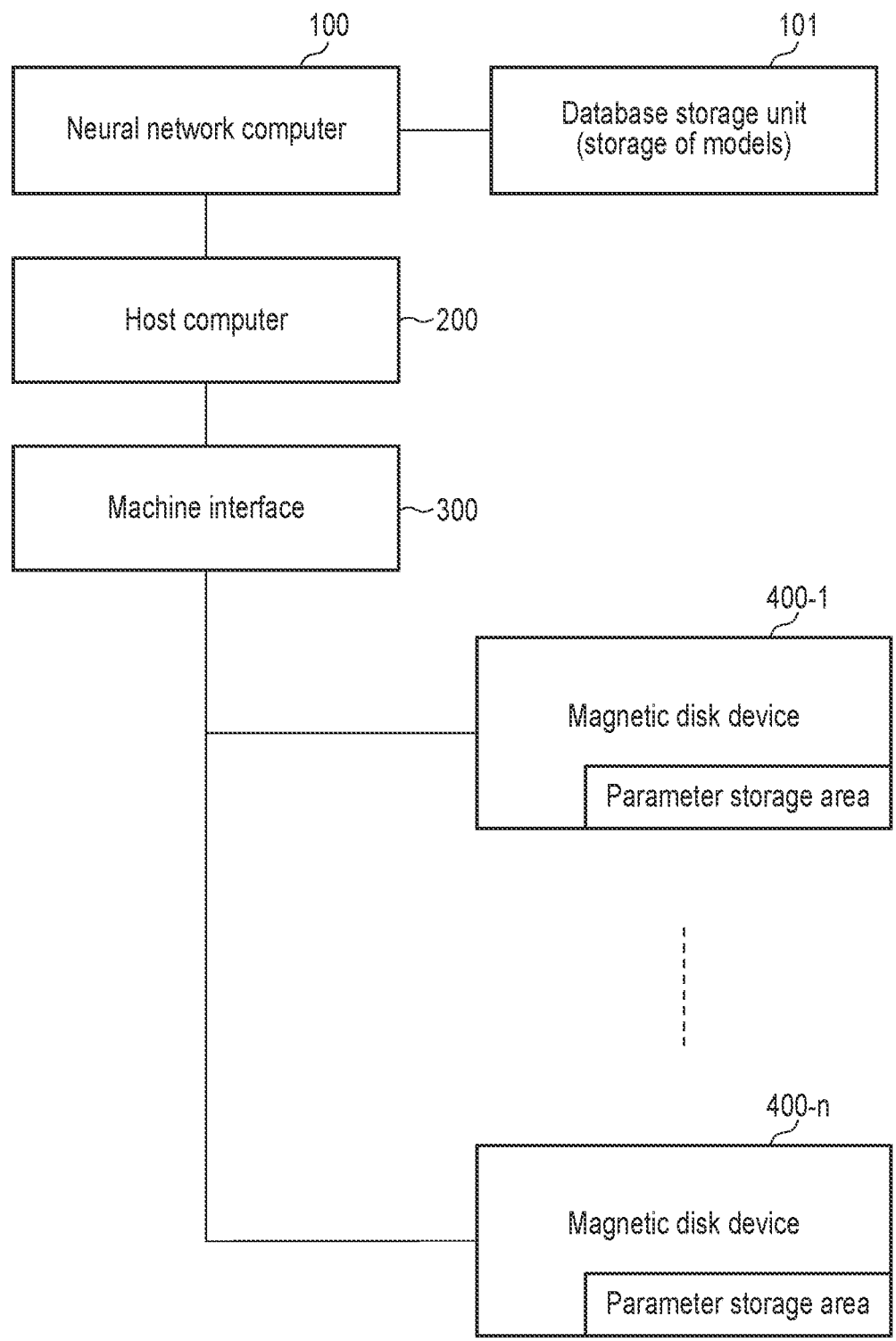
F I G. 1

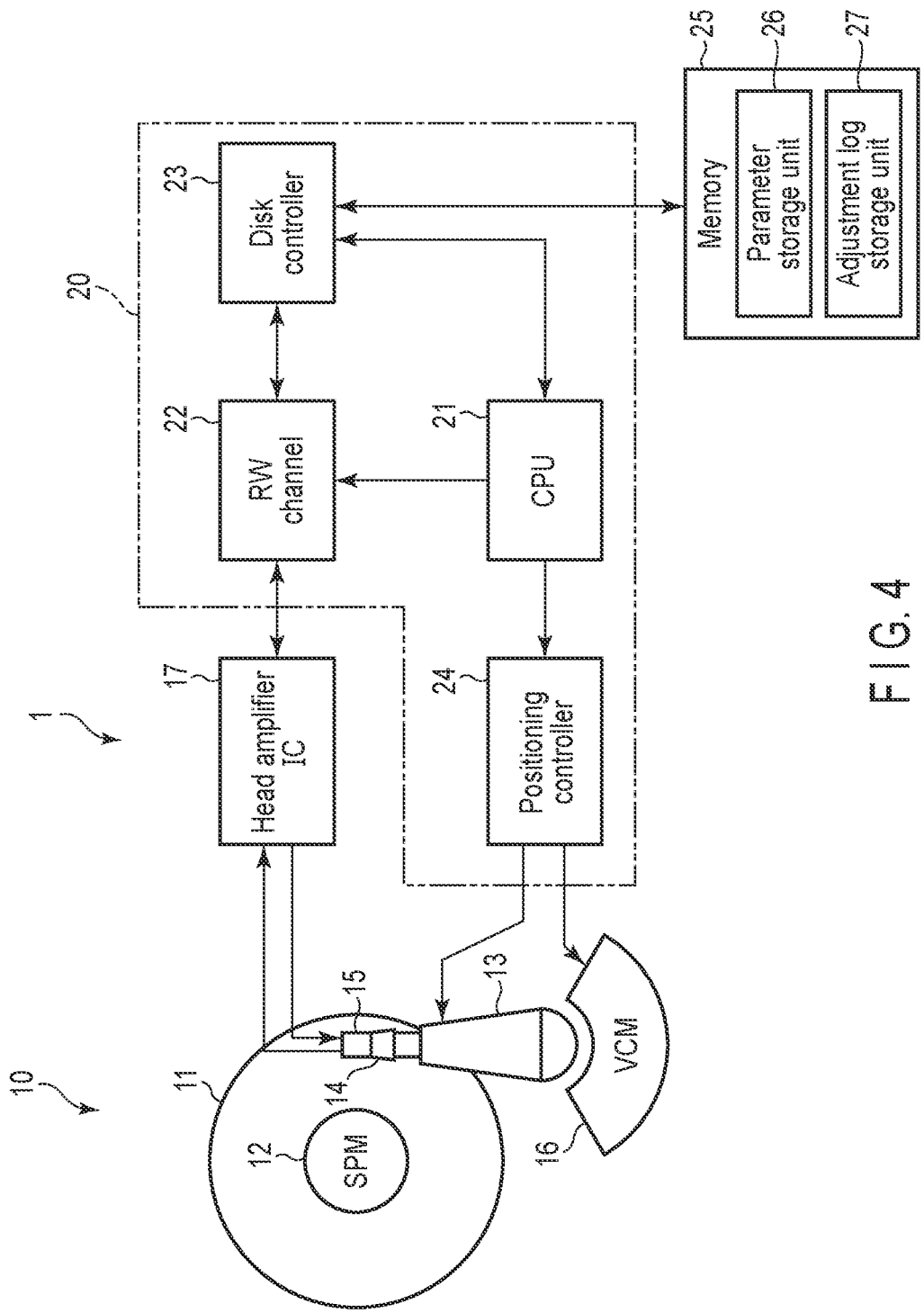
F I G. 4

MAGNETIC DISK DEVICE, RW PARAMETER ADJUSTMENT METHOD OF THE MAGNETIC DISK DEVICE AND RW PARAMETER ADJUSTMENT DEVICE

CROSS-REFERENCE TO RELATED APPLICATIONS

This application is based upon and claims the benefit of priority from Japanese Patent Application No. 2022-042712, filed Mar. 17, 2022, the entire contents of which are incorporated herein by reference.

FIELD

Embodiments described herein relate generally to a magnetic disk device, an RW parameter adjustment method of the magnetic disk device and an RW parameter adjustment device thereof.

BACKGROUND

Magnetic disk devices (which will be referred to as a hard disk device (HDD)) are required to adjust read and write (RW) parameters, such as optimum track per inch (TPI) representing the number of tracks per inch, bit per inch (BPI) representing the number of bits per inch, writer current (Iw) representing recording current, and overshoot amplification (OSA), in order to achieve a large capacity. In combining head media in particular, the magnetic disk devices are required to individually meet various required standards and adjust the RW parameters within a limited testing time.

In conventional RW parameter adjustment, BPI, TPI, Iw and OSA are determined in series. It is thus difficult to satisfy various required standards in a well-balanced manner and it takes time to adjust the RW parameters.

An object of the embodiment is to provide a magnetic disk device which satisfies a plurality of required standards in a balanced manner within a limited testing time and shortens the adjustment time, an RW parameter adjustment method of the magnetic disk device, and an RW parameter adjustment device thereof.

BRIEF DESCRIPTION OF THE DRAWINGS

FIG. 1 is a block diagram showing a configuration of an RW parameter adjustment device of a magnetic disk device according to an embodiment, using an RW parameter adjustment method.

FIG. 4 is a block diagram showing a configuration of the magnetic disk device that is adjusted by the RW parameter adjustment method according to the embodiment.

DETAILED DESCRIPTION

Figure 2A:
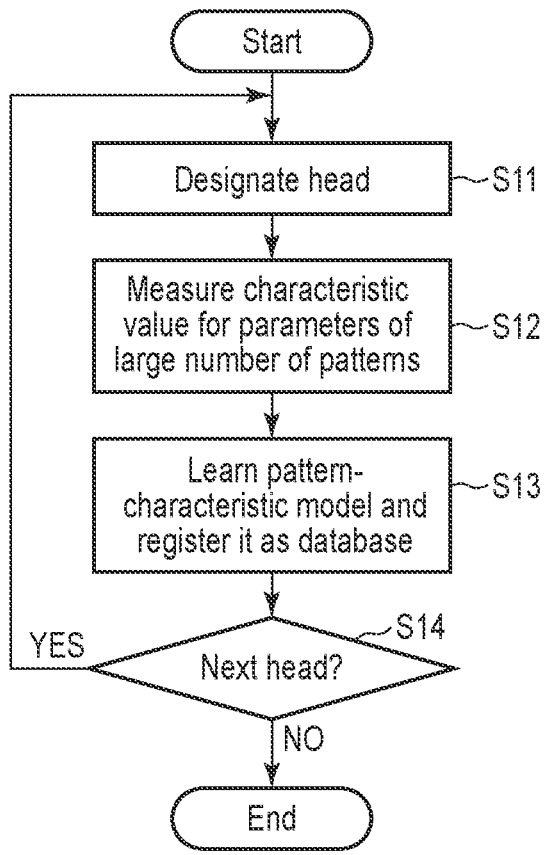
FIG. 2A is a flowchart showing a pre-registration process of the RW parameter adjustment device shown in FIG. 1, which is performed by the RW parameter adjustment method.

An embodiment will be described hereinafter with reference to the accompanying drawings.

In general, according to one embodiment, an RW parameter adjustment method of a magnetic disk device performs a pre-registration process of a magnetic disk device for testing, the pre-registration process including changing conditions of a plurality of read and write parameters to determine a capacity and characteristics for each of various heads of the magnetic disk device for testing to measure the characteristics and creating, for each of the heads, a database in which the measured characteristics are registered, and performs an adjustment process of a magnetic disk device to be adjusted, the adjustment process including changing the conditions of the parameters for each of heads of the magnetic disk device to be adjusted to measure characteristics, searching the database created for each of the heads for a database having similar characteristics, and setting the capacity and characteristics in an appropriate balance among round-robin conditions by estimation of a neural network computer based on the similar characteristics of the database obtained by the searching.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

First, in a conventional RW parameter adjustment method of magnetic disk devices, a drive current Iw is provisionally determined to obtain a desired over and write (OW) characteristic, then OSA is provisionally determined to satisfy a desired error rate, and then TPI and BPI is determined to satisfy a desired characteristic. Thus, the TPI and BPI is adjusted, the OSA is adjusted again, and these adjustments are repeated several times to determine TPI, BPI, Iw and OSA.

In the conventional method described above, the RW parameters are adjusted to satisfy a desired capacity and a desired characteristic; however, the adjustment is serial to cause variations and increase a large number of times of measurement by changing the parameters of TPI, BPI, Iw and OSA.

The RW parameter adjustment method according to the present embodiment resolves the above problem by performing a pre-registration process of a magnetic disk device for testing, the pre-registration process including changing conditions of a plurality of read and write parameters such as TPI, BPI, Iw and OSA to measure characteristics for each head and create a database for each head, and performing an adjustment process of a magnetic disk device to be adjusted, the adjustment process including searching the database for a database of a head having similar characteristics and setting a capacity and characteristics in an appropriate balance among round-robin conditions by estimation of a neural network computer based on the similar characteristics of the database obtained by the searching.

FIG. 1 is a block diagram showing a configuration of an RW parameter adjustment device of the magnetic disk device according to the embodiment, using an RW parameter adjustment method. In FIG. 1, reference numeral 100 denotes a neural network computer (hereinafter referred to as a neural network PC), 200 denotes a host computer (hereinafter referred to as a host PC), and 300 denotes a machine interface (hereinafter referred to as a machine IF). The machine IF 300 holds n magnetic disk devices (hereinafter referred to as HDD) 400-1 to 400-n.

The neural network PC 100 includes a database storage unit 101 that stores a database indicating the characteristics of each head, and its processing operation is roughly divided into a pre-registration process and an adjustment process.

Figure 2B:
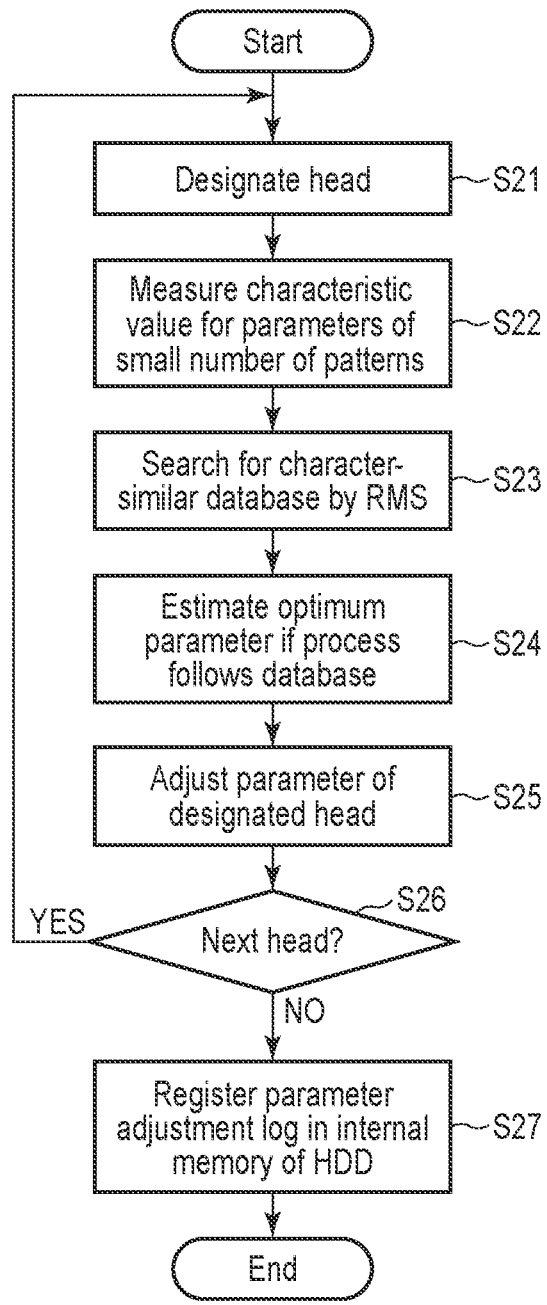
FIG. 2B is a flowchart showing an adjustment process of the RW parameter adjustment device shown in FIG. 1, which is performed by the RW parameter adjustment method.
Figure 3:
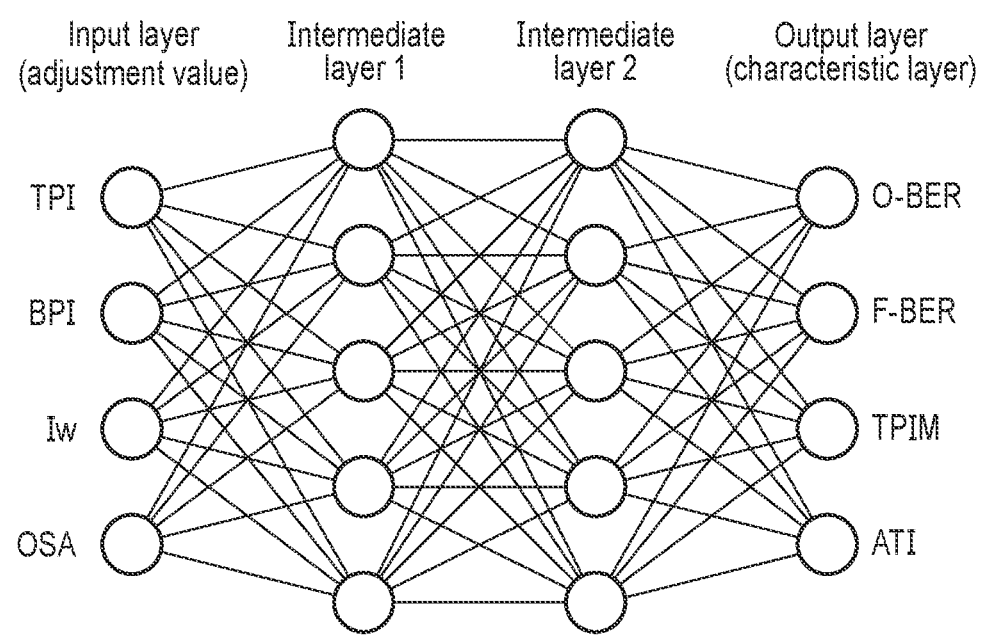
FIG. 3 is a conceptual diagram showing an example of use of a neural network PC of the RW parameter adjustment device shown in FIG. 1.

FIG. 2A and FIG. 2B are flowcharts each showing a processing operations of the neural network PC 100. The flowchart of FIG. 2A shows a pre-registration process and that of FIG. 2B shows an adjustment process. FIG. 3 is a conceptual diagram showing an example of use of the neural network PC 100.

In the pre-registration process shown in FIG. 2A, first, various RW heads of the HDDs 400-1 to 400-n, which are held in the machine IF 300 through the host PC 200 and used for testing, are designated in sequence (step S11). Then, the conditions of TPI, BPI, Iw and OSA (RW parameters to be input) are changed according to a large number of patterns to measure the characteristics of O-BER, F-BER, TPIM and ATI for each of the RW parameter to be input (step S12). Then, the characteristics measured for each of the heads are registered as a database in the database storage unit 101 (step S13). The pre-registration process is repeated for all of the heads (step S14).

As the database, for example, the characteristics for 100 heads of the HDDs are prepared in advance. As adjustment values of parameters for determining capacity and characteristics per head and zone, TPI, BPI, Iw and OSA having the maximum area density satisfying the criteria (evaluation standard) are changed, and a large number of characteristics of O-BER, F-BER, TPIM and ATI (correspondence: TPI→O-BER, BPI→F-BER, Iw→TPIM, OSA→OW) are measured as a database for each of the heads. This multiple measurements are performed by, for example, 15000 combinations (models) of the characteristics. As shown in FIG. 3, the neural network PC 100 includes an input layer (adjustment value), an intermediate layer 1, an intermediate layer 2, and an output layer (characteristic value). The number of inputs to the neural network PC 100 can optionally be set, as can be the number of outputs therefrom. Various activation functions, the number of layers, batch size, and evaluation functions are set to currently optimal values.

In the adjustment process shown in FIG. 2B, first, the heads are designated in sequence using an HDD to be adjusted (step S21). Then, a small number of measurements of 20 points per head and zone by the combination (model) of TPI, BPI, Iw and OSA and O-BER, F-BER, TPIM and ATI are performed (step S22). From the measurements, the HDD searches for a similar database (model) by root mean square (RMS) (step S23). A neural network process using the database is performed to estimate O-BER, F-BER, TPIM and ATI for each of the TPI, BPI, Iw and OSA and thus estimate an optimum parameter if the process follows the database (step S24). The parameter of the designated head is set to the optimum parameter (step S25). The process is repeated for all the heads (step S26). Thus, a result corresponding to the conditions can be estimated, and the optimally balanced parameter can be set. Finally, the parameter adjustment log is registered in an internal memory of the adjusted HDD so that it can be confirmed at the time of shipment (step S27).

Although the foregoing adjustment process is directed to a case of processing the HDDs in series, a large number of magnetic disk devices can be processed in parallel. In addition, the pre-registration process may allow the registration information of the database to be modified, and the adjustment process may include a search from the database whose registration information is modified. The database storage unit 101 may be provided in the interior of the neural network PC 100.

FIG. 4 is a block diagram showing a specific configuration of an HDD 1 that is adjusted by the RW parameter adjustment device described above.

The HDD 1 includes head-disk assembly (HDA) 10, a head amplifier integrated circuit (hereinafter referred to as a head amplifier IC) 17 and a system-on-chip (SOC) 20.

The HDA 10 includes a magnetic disk 11, a spindle motor (SPM) 12, an arm 13 and a voice coil motor (VCM) 16. The magnetic disk 11 is rotated by the SPM 12. A load beam 14 is attached to the tip of the arm 13, and a magnetic head 15 is attached to the tip of the load beam 14. The arm 13 controls the driving of the VCM 16 to move the magnetic head 15 to a specified position on the magnetic disk 11.

The magnetic head 15 has a structure in which a read head element and a write head element are separately mounted on one slider. The read head element reads data from the magnetic disk 11. The write head element writes data to the magnetic disk 11.

The head amplifier IC 16 includes a read amplifier and a write driver. The read amplifier amplifies a read signal read by the read head element and transmits it to an RW channel 22. On the other hand, the write driver transmits a write current corresponding to the write data output from the RW channel 22 to the write head element.

The SOC 20 includes a microprocessor (CPU) 21, the RW channel 22, a disk controller 23 and a positioning controller 24. The CPU 21 is a main controller of driving to perform servo control for positioning the magnetic head 15 via the positioning controller 24 and perform data read and write control via the head amplifier IC 16. The RW channel 22 includes a read channel that processes of a signal of read data and a write channel that processes a signal of write data.

The disk controller 23 performs interface control for controlling data transfer between a host system (not shown) and the RW channel 22. Note that the positioning controller 24 may be implemented as hardware or software (firmware).

The memory 25 includes a volatile memory and a nonvolatile memory. For example, the memory 25 includes a flash memory and a buffer memory formed of a DRAM. The nonvolatile memory of the memory 25 includes a storage unit (not shown) which stores programs and the like necessary for processing by the CPU 21, a parameter storage unit 26 which stores an RW parameter adjustment value when the foregoing RW parameter adjustment process is performed, and an adjustment log storage unit 27 which stores an adjustment log indicating that adjustment is completed. That is, the adjustment log storage unit 27 stores the parameter adjustment log in step S27 described above. When the log is read out, it can be easily confirmed that the head adjustment of the HDD is optimized.

Note that the RW parameter adjustment value and the adjustment log need not be stored in the memory 25 but have only to be stored in any storage area of the HDD.

The advantages obtained from the foregoing adjustment method will be described below.

Figure 5:
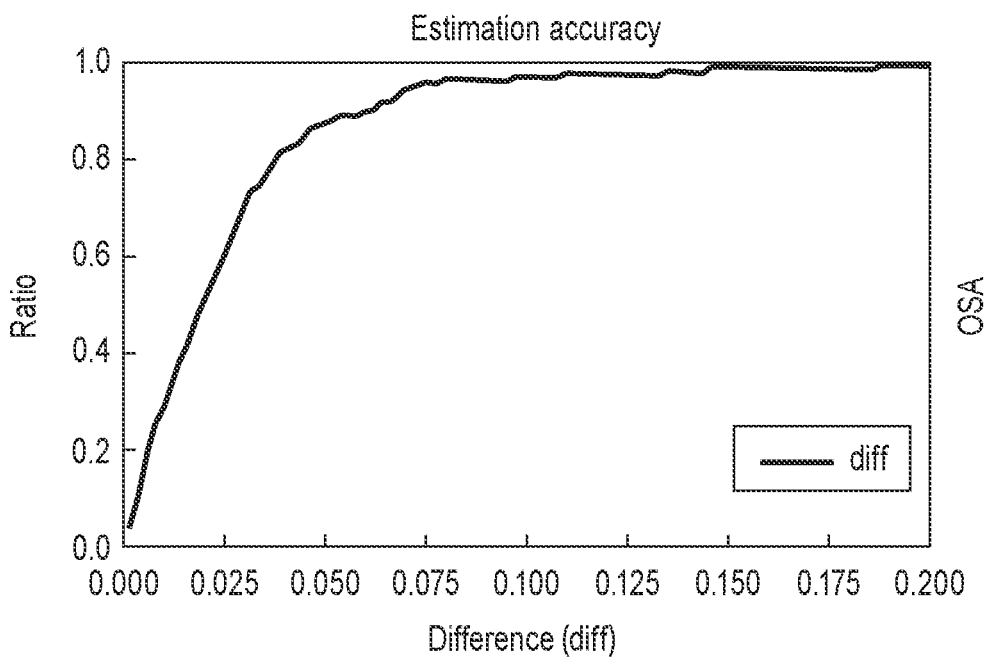
FIG. 5 is a graph showing an example of estimation accuracy of the magnetic disk device whose RW parameters are adjusted by the RW parameter adjustment method according to the embodiment.
Figure 6:
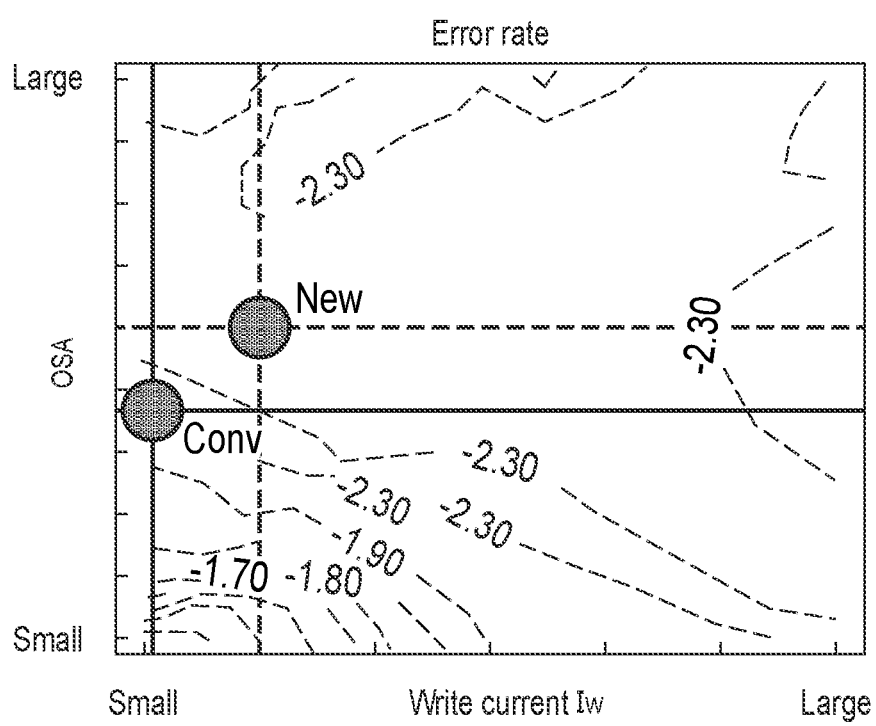
FIG. 6 is a diagram showing an example of error rate optimization of the magnetic disk device in which the RW parameter is adjusted by the adjustment method according to the embodiment.
Figure 7:
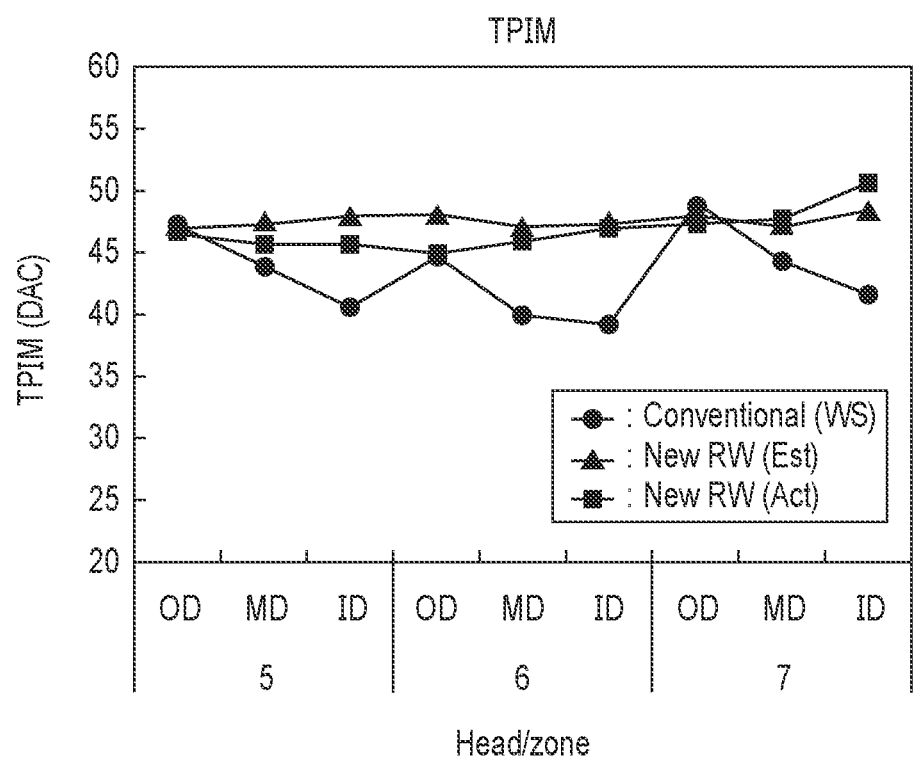
FIG. 7 is a diagram showing an example of TPIM optimization of the magnetic disk device whose RW parameters are adjusted by the RW parameter adjustment method according to the embodiment.

FIG. 5 is graph showing an example of estimation accuracy of the HDD whose RW parameters are adjusted by the RW parameter adjustment method according to the embodiment, FIG. 6 is a diagram showing an example of error rate optimization of the HDD and FIG. 7 is a diagram showing an example of TPIM optimization of the HDD. In FIG. 6, Conv represents an error rate when a capacity and characteristics is set by the conventional adjustment method, and New represents an error rate when a capacity and characteristics is set by the adjustment method of the embodiment. In FIG. 7, Conventional (WS) represent TPIM characteristics when a capacity and characteristics is set by the conventional adjustment method, and New RW (Est) and New RW (Act) represent static TPIM characteristics and dynamic TPIM characteristics, respectively when a capacity and characteristics is set by the adjustment method of the present embodiment.

In the foregoing configuration, as the estimation accuracy, the accuracy that can be used for adjustment was confirmed as shown in FIG. 5. The error rate shown in FIG. 6 was obtained as a result of searching for a setting satisfying the required standard using the accuracy. It was confirmed that RW parameters other than those in the conventional method were searched as the optimum. As for the characteristics at this time, it was confirmed that the variations in the TPIM characteristics, for example, were reduced and improved, while the result of the search satisfied the same capacity as conventional as expected, as shown in FIG. 7.

As described above, the use the adjustment method and adjustment device according to the present embodiment makes it possible to satisfy a plurality of required standards in a well-balanced manner and shorten the adjustment time within a limited testing time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A read and write (RW) parameter adjustment method of a magnetic disk device, the RW parameter adjustment method comprising:
    performing a pre-registration process of a magnetic disk device for testing, the pre-registration process including changing conditions of a plurality of RW parameters related to read and write to determine a capacity and characteristics for each of various heads of the magnetic disk device for testing to measure the characteristics and creating, for each of the heads, a database in which the measured characteristics are registered; and
    performing an adjustment process of a magnetic disk device to be adjusted, the adjustment process including changing the conditions of the RW parameters for each of heads of the magnetic disk device to be adjusted to measure characteristics, searching the database created for each of the heads for a database having similar characteristics, and setting the capacity and characteristics in an appropriate balance among round-robin conditions by estimation of a neural network computer based on the similar characteristics of the database obtained by the searching.

2. The RW parameter adjustment method of claim 1, wherein the pre-registration process is performed to measures a large number of characteristics, and the adjustment process is performed to measure a small number of characteristics.

3. The RW parameter adjustment method of claim 1, wherein the neural network computer includes an input layer for adjustment values, a first intermediate layer, a second intermediate layer and an output layer for characteristic values to set the number of inputs and the number of outputs optionally.

4. The RW parameter adjustment method of claim 1, wherein the pre-registration process allows registration information of the database to be modified, and the adjustment process includes searching the database whose registration information is modified.

5. The RW parameter adjustment method of claim 1, wherein the adjustment process is performed to store an adjustment log indicating adjustment of the RW parameters in an internal memory of the magnetic disk device to be adjusted.

6. A read and write (RW) parameter adjustment device comprising:
    a plurality of magnetic disk devices;
    a holding device which holds the magnetic disk devices; and
    an information processing device which performs a pre-registration process of a magnetic disk device prepared for testing from the holding device, the pre-registration process including changing conditions of a plurality of RW parameters related to read and write to determine a capacity and characteristics for each of various heads of the magnetic disk device for testing to measure the characteristics and creating, for each of the heads, a database in which the measured characteristics are registered, and which performs an adjustment process of a magnetic disk device to be adjusted, the adjustment process including changing the conditions of the parameters for each of heads of the magnetic disk device to be adjusted to measure characteristics, searching the database created for each of the heads for a database having similar characteristics, and setting the capacity and characteristics in an appropriate balance among round-robin conditions by estimation of a neural network computer based on the similar characteristics of the database obtained by the searching.

7. The RW parameter adjustment device of claim 6, wherein the pre-registration process is performed to measures a large number of characteristics, and the adjustment process is performed to measure a small number of characteristics.

8. The RW parameter adjustment device of claim 6, wherein the information processing device is a neural network computer and includes an input layer for adjustment values, a first intermediate layer, a second intermediate layer and an output layer for characteristic values to set the number of inputs and the number of outputs optionally.

9. The RW parameter adjustment device of claim 6, wherein the pre-registration process allows registration information of the database to be modified, and the adjustment process includes searching the database whose registration information is modified.

10. The RW parameter adjustment device of claim 6, wherein the adjustment process is performed to store an adjustment log indicating adjustment of the parameters in an internal memory of the magnetic disk device to be adjusted.

11. The RW parameter adjustment device of claim 6, wherein the information processing device includes a storage unit which stores the database.

12. A magnetic disk device comprising:
a connector for connecting to the RW parameters adjustment device as an adjustment target; and
an internal memory connected to the RW parameter adjustment device to record an adjustment log indicating that the parameters are adjusted by the adjustment process; wherein
the RW parameter adjustment device performs a pre-registration process of a magnetic disk device for testing, the pre-registration process including changing conditions of a plurality of RW parameters related to read and write to determine a capacity and characteristics for each of various heads of the magnetic disk device for testing to measure the characteristics and creating, for each of the heads, a database in which the measured characteristics are registered; and which performs an adjustment process of a magnetic disk device to be adjusted, the adjustment process including changing the conditions of the RW parameters for each of heads of the magnetic disk device to be adjusted to measure characteristics, searching the database created for each of the heads for a database having similar characteristics, and setting the capacity and characteristics in an appropriate balance among round-robin conditions by estimation of a neural network computer based on the similar characteristics of the database obtained by the searching.

* * * * *